Aug. 22, 1961 S. M. FREY ET AL 2,997,122
VEHICLE BODY
Filed March 23, 1960 2 Sheets-Sheet 1
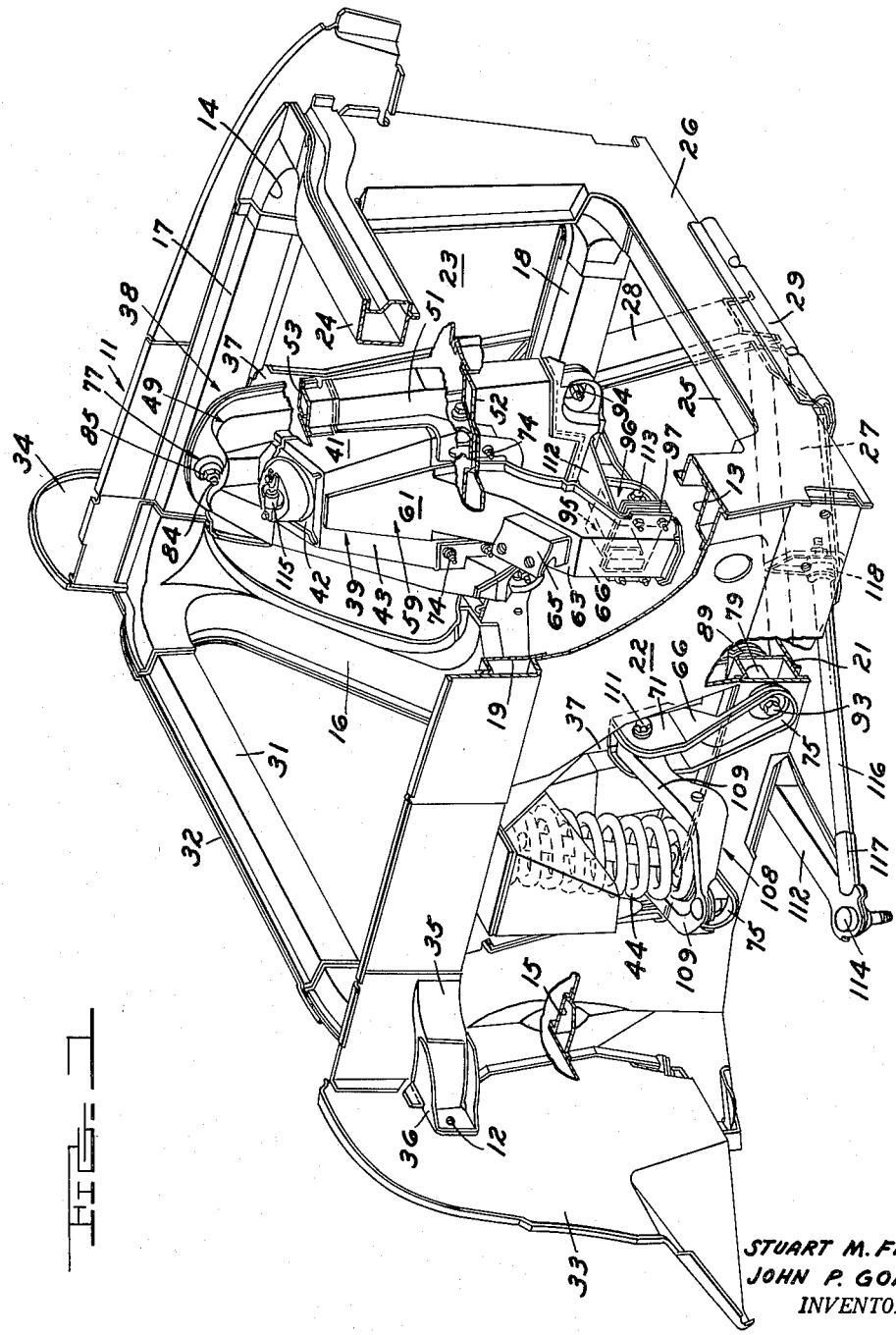
STUART M. FREY
JOHN P. GORYS
INVENTORS
BY J. R. Faulkner
J. J. Roethel
ATTORNEYS

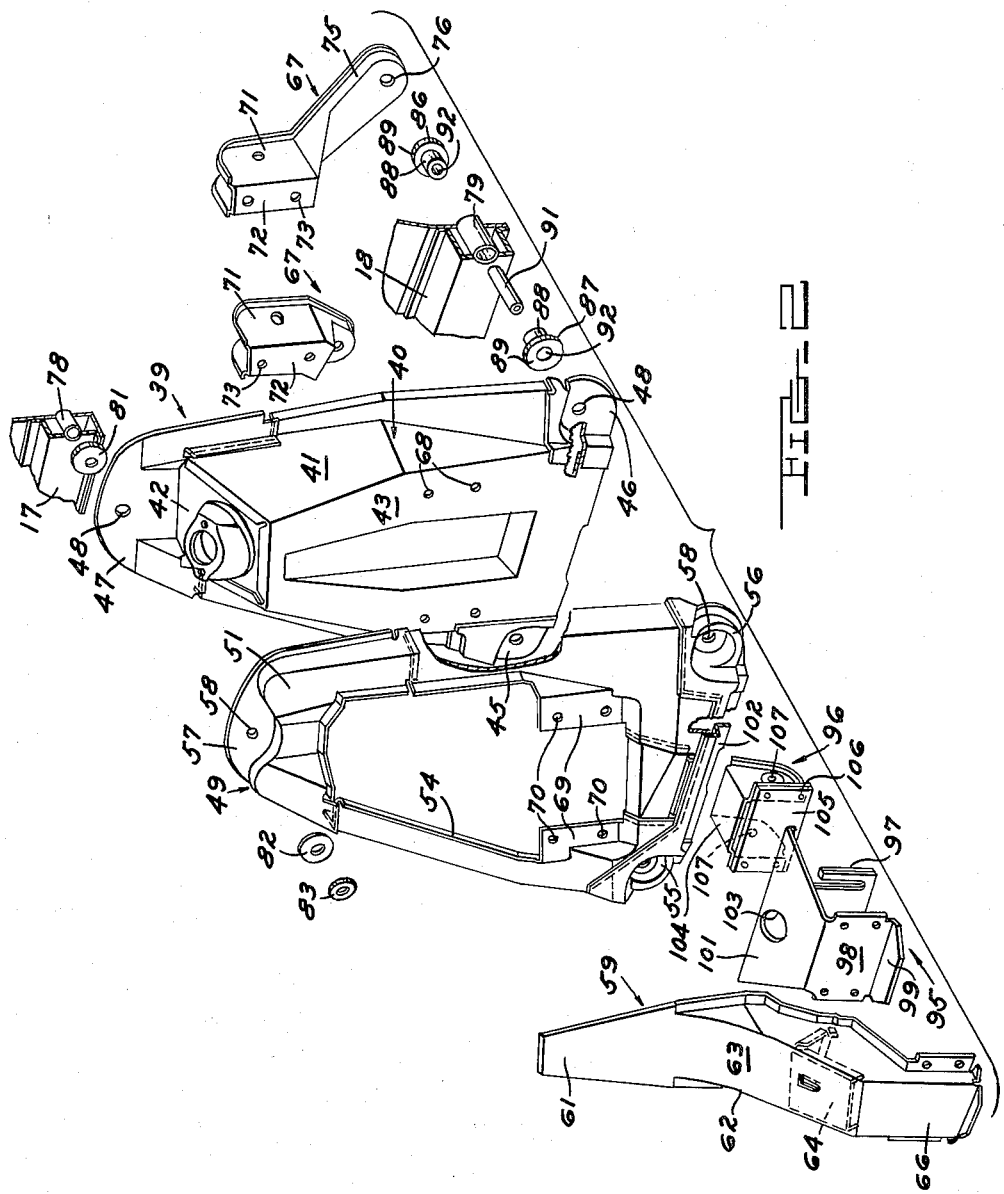

United States Patent Office 2,997,122
Patented Aug. 22, 1961

2,997,122
VEHICLE BODY
Stuart M. Frey and John P. Gorys, Detroit, Mich., assignors to Ford Motor Company, Dearborn, Mich., a corporation of Delaware
Filed Mar. 23, 1960, Ser. No. 17,002
9 Claims. (Cl. 180—64)

The present invention relates to motor vehicle bodies and more particularly to an engine and front wheel suspension mass isolation system.

Regardless of the manner in which a vehicle is constructed, i.e., whether the heretofore conventional body on frame construction, self-supporting body with a preassembled bolt-on front end, or unitized body construction is used, the problem of isolation of engine and road wheel vibrations is ever present. It has been proposed that the engine and the front axle unit or front wheel suspension unit, in vehicles provided with independent front wheel suspension systems, be assembled to an independent subframe or auxiliary frame. The subframe or auxiliary frame is then connected or attached by strategically placed resilient cushion devices to the vehicle body, the cushion devices being effective to isolate or minimize the transfer of noise and vibrations to the body of the vehicle from the wheels and the engine.

One major disadvantage inherent in the use of a subframe or an auxiliary frame construction is the additional weight added to the engine end of the vehicle by such a structure. Although much progress has been made in reducing the weight of the engine itself, the addition of power brakes, power steering units and many electrically operated accessories in the vehicle, the latter requiring heavier storage batteries and heavier generators to meet the current demands of these accessories, have all resulted in additional weight being added to the engine end of the vehicle. Thus, the weight of a subframe or auxiliary frame cannot readily be counterbalanced.

Further, the use of an auxiliary or subframe necessarily adds vertical height to the engine compartment, which is undersirable in view of the trend to lower hood lines.

It is an object of the present invention to provide improved dual function engine mount and front suspension support structures which add very little to the weight of the engine end of the vehicle. It is a further object of the present invention to provide a construction and arrangement which permits the engine to be mounted as low as or even lower than engines supported in conventional vehicle body structures now being used. The improved dual function engine mount and front suspension structures embodying the present invention permit effective provisions to be made for the isolation of engine and suspension system vibrations from the body structure at the areas of attachment. Two such structures are used, one for each side of the vehicle body, each of the structures being mounted independently of the other. Although in the illustrated embodiment of the invention the engine mount and suspension support structures are shown in relation to a bolt-on front end assembly, it is a further object of the invention to provide a support structure and method of attachment adaptable to other forms of vehicle body construction.

Each of the support structures, which hereinafter may be referred to as isolation members, embodying the present invention is adapted to have attached thereto a front engine mount, an upper suspension arm, a suspension spring, a lower suspension arm rear strut, a rebound cutoff shock absorber, and a jounce bumper. The lower suspension arm forward strut is attached directly to the bolt-on frame structure through a compliant rubber doughnut. Each isolation member is compliantly mounted to a bolt-on front end structure through at least three mounts per member. It is an object of this construction and arrangement to provide compliance or harshness reduction, but not such a degree of compliance to make ride and handling characteristics objectionable.

Other objects and advantages of the present invention will become more apparent as this description proceeds, particularly when considered in connection with the accompanying drawings, in which:

FIG. 1 is a perspective view of a front end assembly having the independent engine mount and front suspension support structures or isolation members mounted thereon, portions of the structural members being cut away to reveal structural details; and FIG. 2 is an exploded view illustrating the component parts of the engine mount and front suspension support structures or isolation members embodying the present invention.

Referring now to the drawings, reference numeral 11 indicates generally a vehicle bolt-on front end unit which is adapted to be secured by a plurality of mounting bolts 12 to the cowl structure (not shown) of a vehicle body. The front end unit 11 is adapted to receive and support all of the vehicle front end components such as the wheel suspension units, engine and transmission unit, steering gear and linkage, radiator and electrical units. These components may be assembled to the front end unit 11 prior to the assembly of the unit to the body. Finished sheet metal body components such as the fenders and hood are assembled to the unit after attachment to the body.

As shown in FIG. 1, the front end unit 11 in its preferred form comprises a framework construction from stamping stock which is shaped to form box channel sections opened to the outside. The framework comprises four substantially vertical supports of which the fender front apron and radiator supports are shown at 13 and 14 and the fender rear apron supports at 15 and 16, respectively. Upper and lower frame side members 17 and 18 are weldably secured to the front and rear supports 14 and 16, respectively, on one side of the unit. On the opposite side of the unit, the upper frame side member 19 and the lower frame side member 21 are weldably secured to the front and rear supports 13 and 15, respectively. The sides of the unit are closed in by welding fender apron assemblies 22 and 23 to the vertical supports 13, 14, 15 and 16 and the upper and lower frame members 17, 18, 19 and 21. The fender apron assemblies 22 and 23 not only cover the open channel portions but also span the area between the channel sections. The two side sections formed by the vertical supports, the upper and lower frame members, and the fender apron assemblies are connected in the front by box channel upper and lower front fender and radiator cross support members 24 and 25 which are secured to the upper and lower portions of the vertical supports 13 and 14. A collar shaped front fender and radiator reinforcement 26 is weldably secured to the vertical supports 13 and 14, cross supports 24 and 25 and apron assemblies 22 and 23 to close in the vertical supports and complete the box channel sections in the front. The lower front corners of the assembly are braced by diagonally extending channel sections 27 and 28 extending between the lower frame members 18 and the lower cross member 25. A stone deflector or shield 29 welded to the front face of the radiator collar 26 at the lower edge thereof and extending rearwardly beneath the frame member 25 is provided to complete the front end assembly.

The rear attachment of the two sides is provided through the box channel upper rear cross member 31 and reinforcement 32 which closes the opening. Because of the extension of the engine and the transmission at the rear of the engine, a lower rear cross member is not utilized. The rear portion of the rear vertical supports 15 and 16 of the unit is completed by the welding of rear splash shields 33 and 34 to both of the vertical supports 15 and 16 and aprons 22 and 23 to complete the box sectioning of the rear vertical supports. Adjacent to the splash shields 33 and 34, the aprons 22 and 23 are outwardly embossed at 35 to provide a support for the upper strut mounting bracket 36 which is weldably secured to both the embossment 35 and the splash shields 33 and 34. The bracket and mounting is identical for both sides of the unit, hence only one bracket and embossment is shown in the drawings.

The front end unit 11 as described has many of the features of construction of the front and end bolt-on unit disclosed in U.S. application Serial No. 715,583, filed in the name of Jesse W. Richards and assigned to the assignee of the present application, now U.S. Patent 2,955,870 issued October 11, 1960. In the front end unit disclosed in that patent, the apron assemblies were stamped to form suspension pockets adapted to receive the suspension units of the vehicle. Separate provision was made for supporting the engine on the frame members.

In the structure embodying the present invention, the fender aprons are each provided with an enlarged opening 37 in substantially the same location as the suspension pocket of the aforementioned application. Each opening 37 is closed by a dual function engine mount and front suspension support structure or isolation member assembly generally designated 38. Two of these units 38 are utilized, one being supported on the upper and lower frame members 17 and 18, respectively, and the other being supported on the upper and lower frame members 19 and 21, respectively. The two units are symmetrical and, accordingly, only one will be described in detail. The component parts of each unit 38 are shown in FIG. 2. To obtain minimum weight and maximum strength and rigidity characteristics, each isolation member 38 comprises an assembly of weldments fabricated from sheet metal stampings and other stamped pieces.

The base unit of each isolation member 38 is the weldment generally designated 39, which may be referred to as the spring tower or suspension housing. The suspension housing 39 is provided with side walls 41, a roof portion 42 and a front wall 43. These walls and roof portion form a pocket which houses the coil spring and shock absorber unit 44, shown in FIG. 1. The suspension housing is provided with appropriate flanges 45, 46 and 47, each of the flanges having suitable holes 48 therein adapted to receive an element of the attachment devices for mounting the housing to the bolt-on front end unit 11 frame members, as will be more fully explained.

A collar shaped reinforcing weldment, generally designated 49 is provided which fits over the housing 39. The reinforcing collar 49 is peripherally embossed as at 51 so that when it is positioned over the housing 39, the pocket 40 is ringed by box channel sections, as shown at 52 and 53 in FIG. 1. It will be noted that the upper portion of the pocket 40 projects through the flanged opening 54 defined by the reinforcing collar 49. The reinforcing collar 49 is provided with embossed corner portions 55 and 56 at its lower end and a flange 57 at its upper end. The embossed corner portions 55 and 56 and the flange 57 are provided with holes 58 adapted to align with the holes 48 in the housing flanges.

The isolation member assembly 39 is provided with one additional major component. This is the bracket 59 to which the suspension system lower arm is pivotally connected and which further provides support for one side of the engine. This bracket 59 is provided with a flange portion 61 adapted to be welded or otherwise secured to the front wall 43 of the housing 39. Below its flange the bracket is flared out the provide an angularly inclined U-shaped channel section 62, the upper outer surface of which provides an inclined shelf portion 63. The shelf portion 63 is structurally reinforced therebeneath by a reinforcing member 64. The shelf portion 63 is adapted to reecive the resilient engine mount device 65 (see FIG. 1). The lower end portion 66 of the bracket 59 extends in a substantially vertical direction. It will be noted that it is in spaced parallel relationship to the lower end of the housing 39 and collar 49 assembly.

The three units of the isolation member 38, i.e., the suspension housing 39, the reinforcing collar 49 and the bracket 59 are preferably preassembled and welded into a unitized structure prior to installation in the vehicle.

There are a number of other components required to complete the installation, but these are primarily bolt-on type members. For example, a pair of symmetrical brackets 67 are mounted to the interior face of the front wall 43 of pocket 40 of the suspension housing 39. It will be noted that the pocket front wall 43 is provided with a pair of vertically aligned holes 68 on each side of the central opening therein. The collar 49 is provided with flange portions 69 projecting into the opening 54 defined by the collar periphery, the flange portion 69 being provided with holes 70 in alignment with the holes 68 in the pocket wall 43. The upper channel shaped portions 71 of the brackets 67 are provided in their base wall 72 with similarly aligned holes 73. Each set of holes 68, 70 and 73 are adapted to receive bolts or the like 74 (see FIG. 1) for securing the brackets in position within the pocket 40 of the suspension housing 39. It will be noted that the lower end portion 75 of each bracket 67 is laterally offset from the inner face of the suspension housing 39 when the bracket is mounted thereon. The lower end 75 of the bracket 67 is provided with a hole 76 adapted to be in alignment with the hole 48 in the flange portion 46 of the suspension housing 39.

Each isolation member assembly 38 is secured to the bolt-on front end unit by means of attachment devices, generally designated 77, which include resilient members effective to insulate or prevent any metal to metal contact between the isolation member assembly and the bolt-on unit frame structure.

Referring to FIG. 2, a fragmentary portion of the upper frame member 17 is shown. It will be noted that the frame member 17 is provided with a laterally extending sleeve or bushing 78. The lower frame member is provided with similar sleeves or bushings 79. The sleeves or bushings 78 and 79 define laterally extending holes through the frame members 17 and 18. In the lower frame member 18 there are two sleeves or bushings 79 which are substantially equally spaced on each side of a vertical line passing through the center of the upper sleeve or bushing 78.

The upper end of the isolation member 38 is mounted to the upper frame member 17 as follows: A flat rubber bushing or doughnut 81 is interposed between the inner face of the upper frame member 17 and the adjacent flange face of the isolation member 38. A similar rubber bushing or doughnut 82 is positioned against the front face of the flange 57 on the isolation member reinforcing collar 49. The bushing 82 is covered in part by a washer 83. A suitable bolt or stud 84 is inserted from the outer side of the upper frame member 17 through the sleeve 78 and then through the rubber bushing 81, the aligned holes 48 and 58 in the isolation member suspension housing and reinforcing collar flanges, a second rubber bushing 82 and the washer 83. A suitable nut device 85 is threaded onto the bolt 84 to retain the latter and the components through which it passes in assembled relationship.

The mounting or attachment of the two lower corners of the isolation member 38 on the lower frame member 18 is a little more elaborate. It will be noted that the frame member 18 is straddled by each lower corner of the isolation member 38 and the lower end portion 75 of the respective bracket 67. The isolation member and bracket are isolated from metal to metal contact with the respective side faces of the frame member 18 by resilient shoulder bushings 86 and 87. The body portion 88 of each shoulder bushing 86 and 87 projects into the respective sleeve 79 and the shoulders 89 on the bushings provide the resilient cushion between abutting flange, bracket and frame member faces. A metal spacer sleeve 91 is inserted through the aligned bores 92 of the bushings 86 and 87 to receive and isolate the bolts 93 from the bushings. The bolts 93 preferably are inserted from the outer side, that is, through the end portions 75 of the bracket 67 and then through the rubber bushings and sleeves comprising the attachment device so that the threaded end of the bolt will end up within the embossed corner portions 55 or 56 of the reinforcing collar 49. Suitable nut devices 94 are then threaded onto the bolts 93 to retain the components in assembled relationship.

With reference to FIG. 2, it will be noted that there are several other members associated with the isolation member assembly 38 which as yet have not been described. These comprise a reinforcing member 95, a bracket 96 and shims 97. The reinforcing member 95 is provided with a plate portion 98 adapted to complete the box channel section at the lower end 66 of the bracket 59. The plate portion 98 is provided at its lower edge with a short flange 99 positioned to underlie the end of the lower end portion 66 of the bracket 59. At its upper edge the plate portion 98 is provided with an oppositely extended elongated flange 101 adapted to overlie the bracket 96, as best seen in FIG. 1. The flange 101 is apertured at 103 to provide access to the bolt (not shown) securing the resilient engine mount 65 to the shelf portion 63 of the bracket 59.

The shims 97 are used to properly space the bracket 96 on the inner face of the lower end of the bracket 59. The bracket 96 comprises a flanged channel section member 104 welded to a reinforcing plate 105. The overlying flanges and edge portions of the reinforcing plate 105 are provided with stud receiving apertures 106 for securing the bracket 96 to the bracket 95. The vertical side walls of the bracket 96 are provided with laterally extending pivot pin receiving aligned apertures 107, for a purpose to be explained.

The mounting of the independent front wheel suspension units to the isolation members 38 follows conventional practice. Each upper suspension arm or wishbone 108 is swingably connected at the inner ends of its arms 109 to the upper end 71 of a respective bracket 67 through a suitable pivot stud or the like 111. Each lower suspension arm 112 is pivotally connected to a bracket 96 by means of a pivot stud or the like 113 received in the bracket apertures 107. It will be understood that a steering spindle arm (not shown) attached to a brake backing plate (not shown) links the upper and lower suspension arms 108 and 112 through ball joints, as at 114, which permit movement of the spindle arm for steering and spring action.

The coiled spring of the spring shock absorber unit 44 is mounted on the upper side of the upper suspension arm 108 and the top of the coiled spring is retained beneath the roof portion 42 of the spring tower 39. Each shock absorber is attached to a bracket 115 at the top of the spring tower 39.

Each lower suspension arm forward or stabilizing strut 116 is fastened at 117 to a suspension arm 112 to the bolt-on frame structure through a compliant rubber doughnut 118.

Thus, it is seen that the isolation members 38 are insulated or isolated from each of the components of the vehicle with which they are associated. Each isolation member 38 is isolated from the vehicle engine through the resilient rubber mounts 65. Each isolation member 38 is isolated from the vehicle bolt-on front end unit frame structure through the three points of attachment, the single point of attachment to the upper frame member 17 and the two spaced points of attachment to the lower frame member 18, and by means of the compliant rubber doughnut 118 which isolates the forward stabilizing strut 116 from the frame. Each isolation member requires a substantially minimum amount of room on each inner side of the frame structure. Thus, the space between the two isolation members 38 is available to receive the engine permitting the latter to be positioned as low as desired. And, it is believed readily apparent that each isolation member 38 adds very little weight to the front end of the vehicle since it merely takes the place of structure which would ordinarily be present to house the suspension units and to support the engine.

It will be understood that the invention is not to be limited to the exact construction shown and described, but that various changes and modifications may be made without departing from the spirit and scope of the invention, as defined in the appended claims:

We claim:

1. In a motor vehicle having an engine compartment defined by upper and lower frame members at each of its sides, a pair of independent engine and suspension mass isolation units, each isolation unit comprising a suspension housing provided with attachment device receiving portions, isolation type attachment devices securing said receiving portions to respective upper and lower frame members, said suspension housing being constructed and arranged to provide a suspension receiving pocket opening outwardly of said engine compartment, and bracket means mounted on each suspension housing, the bracket means on said suspension housings terminating so as to provide an engine receiving space between said isolation units.

2. In a motor vehicle having an engine compartment defined by upper and lower frame members at each of its sides, a pair of independent engine and suspension mass isolation units, each isolation unit comprising a suspension housing provided with attachment device receiving portions, isolation type attachment devices securing said attachment portions to respective upper and lower frame members, said suspension housing being constructed and arranged to provide a suspension receiving pocket opening outwardly between said upper and lower frame members of said engine compartment, and bracket means mounted on each suspension housing and extending inwardly of said engine compartment upper and lower frame members, the bracket means on said suspension housings terminating so as to provide an engine receiving space between said isolation units.

3. In a motor vehicle having an engine compartment defined by upper and lower longitudinally extending structural members at each of its sides, a pair of independent engine and suspension mass isolation units, each isolation unit comprising a suspension housing member, a reinforcing collar peripherally reinforcing said suspension housing member, said suspension housing and reinforcing collar being provided with aligned attachment device receiving portions, and compliant attachment devices securing said isolation units at said receiving portions to respective ones of said upper and lower frame members, each suspension housing member being provided with an outwardly opening suspension unit receiving pocket adapted to receive an independent wheel suspension unit, and each suspension housing member being provided with bracket means on the wall of its suspension unit receiving pocket adapted to receive an engine mount.

4. In a motor vehicle having an engine compartment defined by upper and lower longitudinally extending structural members at each of its sides, a pair of independent engine and suspension mass isolation units, each isolation unit comprising a suspension housing member, means peripherally reinforcing said suspension housing member, the center section of said suspension housing member being formed as a pocket adapted to receive spring and shock absorber components of a suspension unit, a bracket means carried on the wall of said pocket adapted to receive an engine mount, and compliant attachment devices securing said isolation units to respective ones of said upper and lower frame members.

5. In a motor vehicle having an engine compartment defined by upper and lower longitudinally extending structural members at each of its sides, a pair of independent engine and suspension mass isolation units, each isolation unit comprising a suspension housing member, means peripherally reinforcing said suspension housing member, the center section of said suspension housing member being formed as a pocket adapted to receive spring and shock absorber components of a suspension unit, a bracket means carried on the wall of said pocket adapted to receive an engine mount, and compliant attachment devices securing said isolation units to respective ones of said upper and lower frame members, said isolation units being mounted with said pockets opening outwardly between the upper and lower frame members and said bracket means extending inwardly toward the center of said engine compartment.

6. In a vehicle body provided with longitudinally extending upper and lower frame members, a dual function suspension support and engine mount member provided with a suspension unit coil spring receiving pocket and an engine mount receiving bracket, a spaced pair of bracket members attached to said dual function member one at each side of said receiving pocket, and attachment devices for attaching said dual function members to said upper and lower frame members, said spaced pair of bracket members each straddling said lower frame member and being attached thereto by the same attachment devices securing said dual function member to said lower frame member, said spaced pair of bracket members each pivotally supporting an inner end of an upper suspension unit arm, said attachment devices including resilient members interposed between said frame members and members attached thereto to isolate the vibrations received by the latter from the vehicle road wheels and engine from said frame members.

7. In a vehicle body provided with longitudinally extending upper and lower frame members, a dual function suspension support and engine mount member provided with a suspension unit coil spring receiving pocket and an engine mount receiving bracket, a spaced pair of bracket members attached to said dual function member one at each side of said receiving pocket, attachment devices for attaching said dual function members to said upper and lower frame members, said spaced pair of bracket members each straddling said lower frame member and being attached thereto by the same attachment devices securing said dual function member to said lower frame member, said spring receiving pocket opening outwardly between said upper and lower frame members, said spaced pair of bracket members each pivotally supporting an inner end of an outwardly extending upper suspension unit arm, and a coil spring unit supported on said arm outwardly of said lower frame member and extending upwardly into said receiving pocket inwardly of said upper frame member, said attachment devices including resilient members interposed between said frame members and members attached thereto to isolate any vibrations received by the latter from the vehicle road wheels and engine from said frame members.

8. In a vehicle body provided with longitudinally extending upper and lower frame members, a dual function suspension support and engine mount member provided with a suspension unit coil spring receiving pocket and an engine mount receiving bracket, a spaced pair of bracket members attached to said dual function member one at each side of said receiving pocket, attachment devices for attaching said dual function members to said upper and lower frame members, said spaced pair of bracket members each straddling said lower frame member and being attached thereto by the same attachment devices securing said dual function member to said lower frame member, said engine mount receiving bracket being mounted on the wall of said spring receiving pocket and extending inwardly of said engine compartment upper and lower frame members, said spring receiving pocket opening outwardly between said upper and lower frame members, said spaced pair of bracket members each pivotally supporting an inner end of an outwardly extending upper suspension unit arm, and a coil spring unit supported on said arm outwardly of said lower frame member and extending upwardly into said receiving pocket inwardly of said upper frame member, said attachment devices including resilient members interposed between said frame members and members attached thereto to isolate any vibrations received by the latter from the vehicle road wheels and engine from said frame members.

9. In a vehicle body provided wtih longitudinally extending upper and lower frame members, a dual function suspension support and engine mount member provided with a suspension unit coil spring receiving pocket and an engine mount receiving bracket, a spaced pair of bracket members attached to said dual function member one at each side of said receiving pocket, attachment devices for attaching said dual function members to said upper and lower frame members, said spaced pair of bracket members each straddling said lower frame member and being attached thereto by the same attachment devices securing said dual function member to said lower frame member, said engine mount receiving bracket being mounted on the wall of said spring receiving pocket and extending inwardly of said engine compartment upper and lower frame members, said spring receiving pocket opening outwardly between said upper and lower frame members, said spaced pair of bracket members each pivotally supporting an inner end of an outwardly extending upper suspension unit arm, a coil spring unit supported on said arm outwardly of said lower frame member and extending upwardly into said receiving pocket inwardly of said upper frame member, said attachment devices including resilient members interposed between said frame members and members attached thereto to isolate any vibrations received by the latter from the vehicle road wheels and engine from said frame members, and a lower suspension arm pivotally mounted on said engine mount receiving bracket and extending outwardly beneath said lower frame member in parallel relation to said upper suspension arm.

References Cited in the file of this patent
UNITED STATES PATENTS

| | | |
|---|---|---|
| 1,648,061 | Royce | Nov. 8, 1927 |
| 1,753,839 | Skelton | Apr. 8, 1930 |
| 2,687,860 | McNitt | Aug. 31, 1954 |
| 2,746,556 | Nallinger et al. | May 22, 1956 |